United States Patent
Su et al.

(10) Patent No.: US 12,314,411 B2
(45) Date of Patent: May 27, 2025

(54) DATA ACCESS METHOD AND APPARATUS

(71) Applicant: HUAWEI TECHNOLOGIES CO., LTD., Guangdong (CN)

(72) Inventors: Jie Su, Hangzhou (CN); Caicheng Lin, Shenzhen (CN); Laibin Qiu, Hangzhou (CN); Wei Xu, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 421 days.

(21) Appl. No.: 17/969,889

(22) Filed: Oct. 20, 2022

(65) Prior Publication Data
US 2023/0045119 A1  Feb. 9, 2023

Related U.S. Application Data

(63) Continuation of application No. PCT/CN2020/085969, filed on Apr. 21, 2020.

(51) Int. Cl.
*G06F 16/00* (2019.01)
*G06F 21/62* (2013.01)

(52) U.S. Cl.
CPC .............................. *G06F 21/6209* (2013.01)

(58) Field of Classification Search
None
See application file for complete search history.

(56) References Cited

U.S. PATENT DOCUMENTS

| | | | | |
|---|---|---|---|---|
| 6,414,610 | B1* | 7/2002 | Smith | H03M 7/3088 341/106 |
| 2008/0060080 | A1* | 3/2008 | Lim | H04L 63/107 726/26 |
| 2010/0121892 | A1* | 5/2010 | Matsumoto | G06F 3/0605 711/E12.001 |
| 2012/0215908 | A1* | 8/2012 | Tsunoo | G06F 21/629 709/224 |

(Continued)

FOREIGN PATENT DOCUMENTS

| CN | 103458023 A | 12/2013 |
|---|---|---|
| CN | 109117383 A | 1/2019 |

OTHER PUBLICATIONS

Office Action issued in CN202080093314.4, dated Sep. 4, 2024, 8 pages.

(Continued)

*Primary Examiner* — Hasanul Mobin (57) ABSTRACT

A data access method performed by a processing device is disclosed. The processing device manages a storage device based on a log-structured file system (LFS), where the processing device writes a target file to the storage device based on an out place update (OPU) mechanism; and the processing device writes file attribute information corresponding to the target file in the storage device to out of band (OOB) data of the storage device, to restore, after abnormal power-off, access to the target file by using the file attribute information stored in the OOB data. In this way, when writing the target file to the storage device, the processing (Continued)

device may write a file attribute corresponding to the target file to the OOB data, so that after abnormal power-off, access to the target file may be restored by using the file attribute information.

18 Claims, 9 Drawing Sheets

(56) References Cited

U.S. PATENT DOCUMENTS

| | | | | |
|---|---|---|---|---|
| 2013/0304996 | A1* | 11/2013 | Venkataraman | G06F 11/0715 711/150 |
| 2015/0350107 | A1* | 12/2015 | Kayaba | G06F 21/45 709/225 |
| 2015/0378627 | A1* | 12/2015 | Kitazawa | G06F 21/6209 711/162 |
| 2017/0249257 | A1* | 8/2017 | Bonnet | G06F 12/121 |
| 2018/0102834 | A1* | 4/2018 | Ibach | H04B 10/0793 |
| 2021/0194576 | A1* | 6/2021 | Gareau | H04B 10/0793 |
| 2021/0279445 | A1* | 9/2021 | Ding | G06T 7/0012 |
| 2021/0383798 | A1* | 12/2021 | Zhang | G06F 40/30 |
| 2023/0045119 | A1* | 2/2023 | Su | G06F 3/064 |
| 2023/0274014 | A1* | 8/2023 | Hirota | G06F 21/604 713/193 |

OTHER PUBLICATIONS

Zheng Wenjing, Flash Storage Technology, 2010, 20 Pages totally (with an English translation).

Lee Sungjin et al: "Refactored Design of I/O Architecture for Flash Storage", IEEE Computer Architecture Letters, IEEE,USA, vol. 14, No. 1, Jan. 1, 2015 (Jan. 1, 2015) pp. 70-74, XP011585150.

International Search Report and Written Opinion issued in PCT/CN2020/085969, dated Jan. 21, 2021, 11 pages.

Extended European Search Report issued in EP20932790.7, dated Apr. 19, 2023, 12 pages.

* cited by examiner

| data 0 | node info 0 |
| --- | --- |
| data 1 | node info 1 |
| data 2 | node info 2 |
| data 3 | node info 3 |
| ... | ... |
| data n | node info n |

DATA ACCESS METHOD AND APPARATUS

CROSS-REFERENCE TO RELATED APPLICATIONS

This application is a continuation of International Application No. PCT/CN2020/085969, filed on Apr. 21, 2020, the disclosure of which is hereby incorporated by reference in its entirety.

TECHNICAL FIELD

The present invention mainly relates to the field of file management technologies, and in particular, to a data access method and apparatus.

BACKGROUND

In a Log-structured file systems (LFS) based on an out place update (OPU) mechanism, an updated file may always be located at a log header of the LFS, and in this way, it is convenient for the LFS to manage and update the file. In addition, the OPU mechanism may help a processing device write the updated file to a storage device based on a rank of the updated file in an LFS log, and it is not necessary to determine an original location corresponding to the updated file in the storage device. Therefore, writing performance of the processing device is improved. A file in the storage device can be accessed only when there is index information corresponding to the file in the processing device. Specifically, the index information of the file includes an index address corresponding to each piece of file data in the file. All file data in the file can be accessed only when there is an index address corresponding to each piece of file data in the processing device.

When updating the file in the storage device, the processing device first needs to read the file from the storage device to a memory corresponding to the processing device, and then updates the file data in the file, for example, writes new file data to the file and overwrites original file data in the file with the new file data, and finally rewrites the updated file to the storage device. In this case, compared with an un-updated file, a writing location of the updated file in the storage device changes. Therefore, the updated file cannot be accessed by using the index information corresponding to the file before the file is updated, and index information corresponding to the updated file needs to be established in the processing device. In this way, the updated file can be accessed based on the index information. If a terminal in which the processing device and the storage device are located is powered off in a process of establishing the index information, index addresses of some file data in the file may have not been established during power-off, and this part of file data cannot be accessed.

To resolve a problem that the file data cannot be accessed because the terminal is powered off, a speed of establishing, in a short time, the index address corresponding to the file data in the processing device may be improved, to ensure timeliness of establishing the index information corresponding to the updated file. However, when the file is frequently updated or there is a large quantity of files that need to be updated, this solution causes a problem that a large amount of index information is established in the processing device in a short time; in other words, a data writing amount of the processing device in a short time is greatly increased, and performance of the processing device is reduced.

SUMMARY

This application provides a data access method and apparatus, to ensure that file data that has been written to a storage device during power-off and for which a corresponding index address has not been established in a processing device can be accessed after the processing device is powered on again.

An embodiment of the present invention provides a data access method applied to a processing device. The processing device manages a storage device based on a log-structured file system (LFS), and the method includes: The processing device writes a target file to the storage device based on an out place update (OPU) mechanism; and the processing device writes file attribute information corresponding to the target file in the storage device to out of band (OOB) data of the storage device, to restore, after abnormal power-off, access to the target file by using the file attribute information stored in the OOB data.

In this way, when writing the target file to the storage device, the processing device may write a file attribute corresponding to the target file to the OOB data, so that after abnormal power-off, access to the target file may be restored by using the file attribute information, to prevent loss of the target file.

In an implementation, after being powered on again, the processing device obtains the file attribute information corresponding to the target file from the OOB data of the storage device, where the file attribute information includes writing location information and location offset information of each piece of file data in the target file; and the processing device establishes, in the processing device by using the writing location information and the location offset information in the file attribute information, an index address corresponding to each piece of file data, so that the processing device accesses, by using the index address, file data that has been written to the storage device.

In this way, the processing device may establish, by using the file attribute information stored in the out of band data, an index address corresponding to the file data that has been written to the storage device, to access the written file data by using the index address. In this way, the written file data is restored, and there is no need to write the file data again.

In an implementation, a file attribute information obtaining command is sent to the storage device once or a plurality of times.

In this way, a quantity of times that the processing device sends the file attribute information obtaining command may be adjusted according to an actual requirement.

In an implementation, the file attribute information obtaining command includes: obtaining file attribute information corresponding to one or more target files.

In this way, a quantity of to-be-obtained targets carried in one obtaining command may be adjusted according to an actual requirement.

In an implementation, the file attribute information obtaining command is a read command.

In this way, data stored in the out of band data can be effectively prevented from being damaged in a process in which the processing device obtains the file attribute information.

In an implementation, the obtaining the file attribute information corresponding to the target file from the out of band (OOB) data of the storage device includes: obtaining, from the out of band (OOB) data of the storage device, file attribute information corresponding to target file data, where the target file data is file data that is in the target file and that has been written to the storage device.

In this way, the target file data can be accurately determined, so that the processing device can send the file attribute information obtaining command for the target file data. In this way, the obtained file attribute information is more specific.

In an implementation, that the processing device establishes, in the processing device by using the writing location information and the location offset information in the file attribute information, an index address corresponding to each piece of file data includes: The processing device obtains unwritten file data stored in the processing device, where the unwritten file data is file data that is in the target file and that has not been written to the storage device when the processing device is abnormally powered off; the processing device determines the target file data based on all file data in the target file and the unwritten file data, where the target file data is file data that is in the target file and that has been written to the storage device when the processing device is abnormally powered off; the processing device determines, from the file attribute information, writing location information and location offset information corresponding to the target file data; and the processing device establishes a corresponding index address in the processing device based on the writing location information and the location offset information corresponding to the target file data.

In this way, the corresponding index address may be established for the target file data in all the received file data, so that the established index address is more specific. In addition, a quantity of established index addresses can be reduced, and overall time required for establishing the index address can be reduced.

An embodiment of the present invention provides a data access method applied to a storage device.

The storage device manages an internally stored target file by using a processing device based on a log-structured file system (LFS), and the method includes: When the processing device writes the target file based on an out place update (OPU) mechanism, the storage device writes the target file to a storage medium, and writes file attribute information of the target file to out of band (OOB) data, to provide the file attribute information for the processing device after the processing device is abnormally powered off, and the processing device restores access to the target file by using the file attribute information.

In this way, after a terminal is powered on again, the storage device may send the file attribute information stored in the out of band data to the log-structured file system, so that the processing device establishes an index address, to access, by using the index address, file data that has been written to the storage device. In this way, the file data that has been written to the storage device can be restored, and there is no need to write the file data again.

In an implementation, the file attribute information is sent to the processing device once or a plurality of times.

In this way, a quantity of times that the storage device sends the file attribute information to the processing device may be adjusted according to an actual requirement.

In an implementation, file attribute information corresponding to one or more target files is sent to the processing device each time.

In this way, an amount of file attribute information sent by the storage device to the processing device each time may be adjusted according to an actual requirement.

An embodiment of the present invention provides a data access method applied to a terminal. The processing device manages a storage device based on a log-structured file system (LFS), and when the processing device writes a target file to the storage device based on an out place update (OPU) mechanism, the terminal performs a corresponding data access method.

An embodiment of the present invention provides a processing device, where the processing device includes an I/O interface and a logic circuit, the I/O interface is used for data exchange between the processing device and a storage device, and the logic circuit is used by the processing device to perform a corresponding method.

An embodiment of the present invention provides a storage device, where the storage device includes a logic circuit, an I/O interface, a storage medium, and out of band (OOB) data, the I/O interface is used for data exchange between the storage device and a processing device, the storage medium is configured to store file data, the OOB data is used to store file attribute information corresponding to a target file, and the logic circuit is configured to perform a corresponding method.

An embodiment of the present invention provides a terminal. The terminal includes a processing device and a storage device. The processing device manages the storage device based on a log-structured file system (LFS). When the processing device writes a target file to the storage device based on an out place update (OPU) mechanism, the terminal performs a corresponding method.

An embodiment of the present invention provides a data access apparatus applied to a processing device. The processing device manages a storage device based on a log-structured file system (LFS), and the processing device includes:

a processing unit, configured to write a target file to the storage device based on an out place update (OPU) mechanism.

The processing unit is further configured to write file attribute information corresponding to the target file in the storage device to OOB data of the storage device, to restore, after abnormal power-off, access to the target file by using the file attribute information stored in the OOB data.

In an implementation, the processing unit is further configured to: after the processing device is powered on again, obtain, from the OOB data of the storage device, the file attribute information corresponding to the target file, where the file attribute information includes writing location information and location offset information of each piece of file data in the target file; and the processing unit is further configured to establish, in the processing device by using the writing location information and the location offset information in the file attribute information, an index address corresponding to each piece of file data, so that the processing device accesses, by using the index address, file data that has been written to the storage device.

In an implementation, the processing device further includes a sending unit, configured to send a file attribute information obtaining command to the storage device once or a plurality of times.

In an implementation, the file attribute information obtaining command includes: obtaining file attribute information corresponding to one or more target files.

In an implementation, the file attribute information obtaining command is a read command.

In an implementation, the processing unit is further configured to obtain, from the out of band (OOB) data of the storage device, file attribute information corresponding to target file data, where the target file data is file data that is in the target file and that has been written to the storage device.

In an implementation, the processing unit is further configured to obtain unwritten file data stored in the processing device, where the unwritten file data is file data that is in the target file and that has not been written to the storage device when the processing device is abnormally powered off;

the processing unit is further configured to determine the target file data based on all file data in the target file and the unwritten file data, where the target file data is file data that is in the target file and that has been written to the storage device when the processing device is abnormally powered off;

the processing unit is further configured to determine, from the file attribute information, writing location information and location offset information corresponding to the target file data; and the processing unit is further configured to establish a corresponding index address in the processing device based on the writing location information and the location offset information corresponding to the target file data.

An embodiment of the present invention further provides a data access apparatus applied to a storage device. The storage device manages an internally stored target file by using a processing device based on a log-structured file system (LFS), and includes a processing unit. The processing unit is configured to: when the processing device writes the target file based on an out place update (OPU) mechanism, write, by the storage device, the target file to a storage medium, and write file attribute information of the target file to out of band (OOB) data, to provide the file attribute information for the processing device after the processing device is abnormally powered off, and the processing device restores access to the target file by using the file attribute information.

In an implementation, the storage device further includes a sending unit, configured to send the file attribute information to the processing device once or a plurality of times.

In an implementation, the sending unit is further configured to send file attribute information corresponding to one or more target files to the processing device each time.

DESCRIPTION OF EMBODIMENTS

The following first describes an application scenario of embodiments of the present invention with reference to the accompanying drawings.

Figure 1:
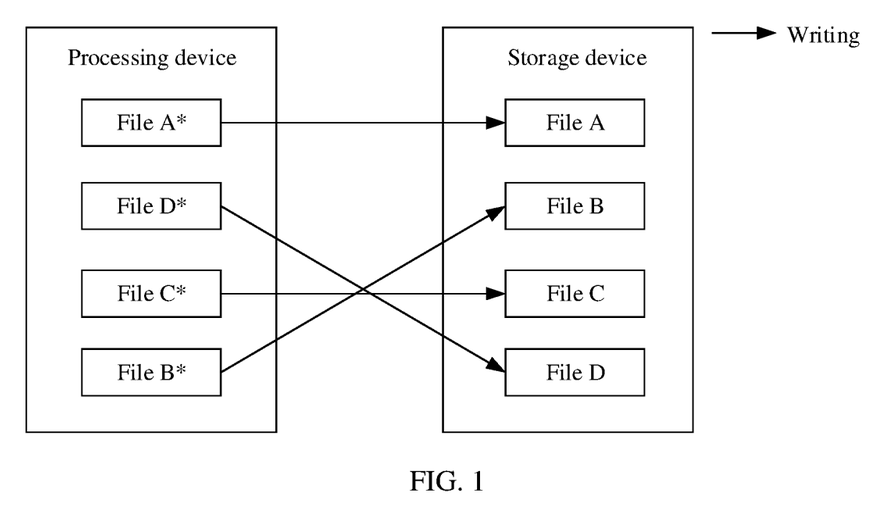
FIG. 1 is a schematic diagram of writing an updated file to a storage device by a processing device according to an embodiment of the present invention.

A terminal manages a file reading and writing process between a processing device and a storage device by using a file system. Generally, the file system acts on a processing device side, so that the processing device completes, based on the file system, an action of reading a file from and writing a file to the storage device. That the processing device updates a file based on the file system is an important function of file management. To update a file generally means writing new file data on the processing device side, modifying, through overwriting, file data that has been written to the file, and the like. To improve performance of updating a file by the processing device, a log-structured file system may be used to ensure that the updated file is always located at a log header of the processing device. In this way, the processing device can preferentially write the updated file to the storage device. Specifically, the processing device sequentially writes updated files to the storage device in an arrangement sequence of the updated files in a log. However, an arrangement sequence of the updated files in the processing device is different from a sequence of storage locations of the files in the storage device before the files are updated. FIG. 1 is a schematic diagram of writing an updated file to a storage device by a processing device according to an embodiment of the present invention. As shown in FIG. 1, a sequence of updated files in the processing device is File A*, File D*, File C*, and File B*, but a sequence of locations of the files in the storage device before the files are updated is File A, File B, File C, and File D. It can be learned that the foregoing writing process is equivalent to a random writing process. In such a random writing process, time needs to be first spent to locate a location of the updated file in the storage device, and consequently, time for writing the file is correspondingly increased, and therefore, writing performance of the processing device is reduced.

Figure 2:
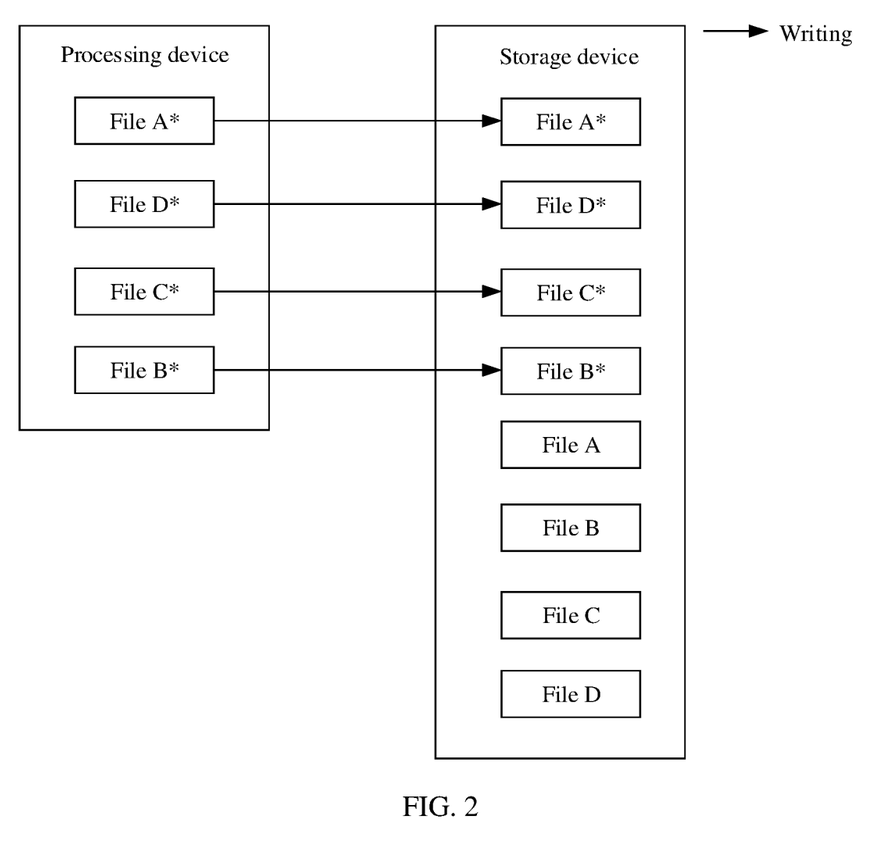
FIG. 2 is a schematic diagram of writing an updated file to a storage device by a processing device according to an embodiment of the present invention.

To improve the writing performance of the processing device, a log-structured file system based on an OPU mechanism may be used, so that the processing device sequentially writes updated files to the storage device in an arrangement sequence of the updated files in a log. In addition, the updated files correspond to new locations in the storage device. FIG. 2 is a schematic diagram of writing an updated file to a storage device by a processing device according to an embodiment of the present invention. As shown in FIG. 2, a sequence of updated files in the processing device is File A*, File D*, File C*, and File B*, but a sequence of locations of the files in the storage device before the files are updated is File A, File B, File C, and File D. However, a new location sequence is used after the updated files are written, that is, File A*, File D*, File C*, and File B*. It can be learned that, based on the OPU mechanism, the processing device may convert a random writing process of files into a sequential writing process, and the sequential writing process can effectively reduce time for finding a location at which the updated file is to be written to the storage device, so that the writing performance of the processing device is improved.

Generally, the processing device writes the updated file to the storage device by using a write command such as write, direct I/O, sync, Fsync, or Fdata sync. Based on an attribute of the write command, for the write command such as direct I/O, Fsync, or Fdata sync, it is required to ensure that a file on which the write command is executed is written to a medium of the storage device, so that a next file can be written. In addition, for a relatively complex or relatively important file, it is also required to ensure that the file is written to the medium of the storage device. That the file is written to the medium of the storage device means that after the processing device writes the file to the storage device, index information corresponding to the file is established in the processing device, so that the processing device can access the corresponding file by using the index information. One file usually includes at least one piece of file data. Correspondingly, each piece of file data corresponds to one index address in the LFS. Therefore, index information of a file needs to include index addresses corresponding to all file data in the file. Correspondingly, only when the index addresses corresponding to all the file data are established in the processing device, it is considered that the file is written to the medium of the storage device.

However, in a process of establishing the index address by the processing device, a case in which the terminal is powered off may occur. In this case, if corresponding index addresses of some file data that has been written to the storage device have not been established in the processing device, the processing device cannot access this part of file data. This is equivalent to that this part of file data is lost.

Embodiment 1

Figure 3:
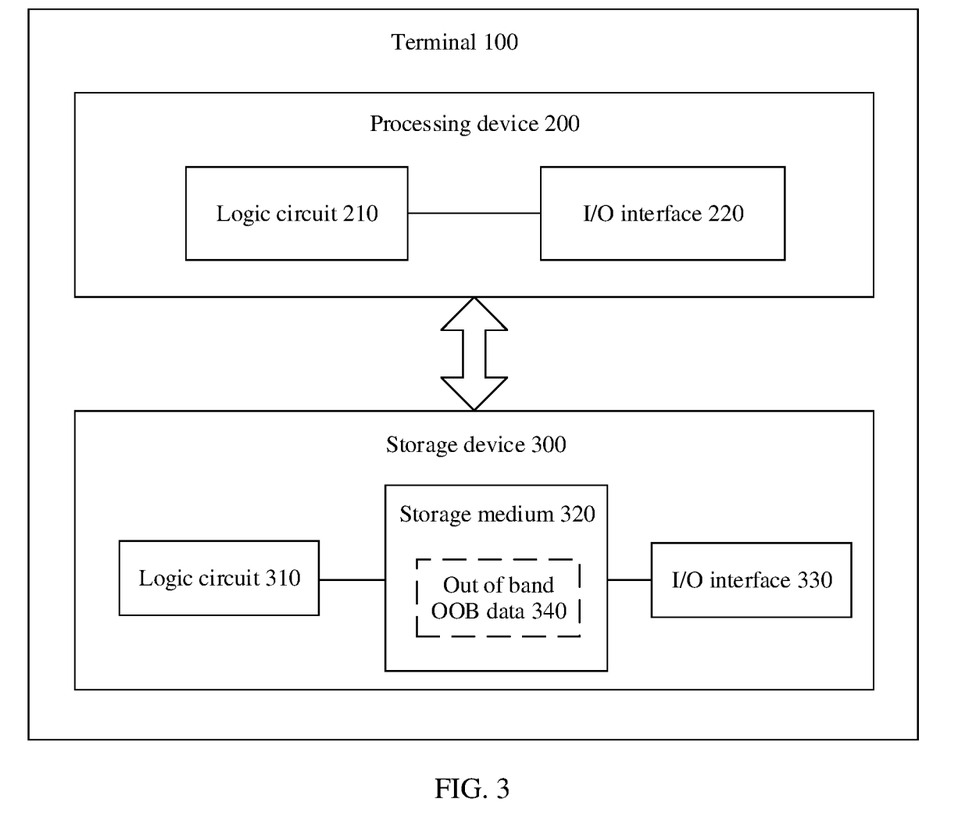
FIG. 3 is a schematic diagram of a structure of a terminal according to an embodiment of the present invention.

To resolve the foregoing problem, Embodiment 1 of the present invention provides a data access method and apparatus. FIG. 3 is a schematic diagram of a structure of a terminal according to an embodiment of the present invention.

A terminal 100 uses a log-structured file system based on an OPU mechanism, and the terminal 100 includes a processing device 200 and a storage device 300. The processing device 200 may include at least one logic circuit and at least one I/O interface. The storage device 300 may include at least one logic circuit, at least one storage medium, at least one piece of out of band data, and at least one I/O interface.

For example, as shown in FIG. 3, the processing device 200 includes a logic circuit 210 and an I/O interface 220, and the logic circuit 210 and the I/O interface 220 are coupled to each other. The logic circuit 210 may invoke one or more program instructions stored in the processing device, so that the processing device 200 performs a related method, for example, generates an instruction for obtaining file attribute information, or establishes an index address.

The I/O interface 220 is configured to establish a data transmission link with the storage device 300, for example, transmit a command or file attribute information.

The storage device 300 includes a logic circuit 310, a storage medium 320, and an I/O interface 330, and the logic circuit 310, the storage medium 320, and the I/O interface 330 are coupled to each other. The storage medium 320 stores a file written by the processing device 200. In addition, the storage medium 320 includes out of band (OOB) data 340, and the out of band data 340 is an independent channel used to transmit important data, and is used to store file attribute information sent by the processing device 200. The out of band data 340 is a non-volatile storage medium, and data stored in the out of band data 340 is not lost after power-off. In this way, the processing device 200 can obtain the file attribute information from the storage device 300 after the terminal is powered on again, to establish an index address. The logic circuit 310 may invoke one or more program instructions in the storage device 300, so that the storage device 300 performs a related method, for example, obtains the file attribute information from the out of band data 340 and determines target file data. The I/O interface 330 is configured to establish a data transmission link with the processing device 200, for example, transmit a command or the file attribute information.

In this embodiment, the terminal may be a device that has a function of writing, transmitting, and storing data, such as a mobile phone, a computer, or a server. In this embodiment of the present invention, the logic circuit 210 of the processing device 200 may be one or more processing units, such as a system on a chip (SoC), a central processing unit (CPU), a microcontroller unit (MCU), and a storage controller. Different processing units may be independent devices, or may be integrated into one or more processors. The logic circuit 310 of the storage device 300 may be one or more processing units, such as an SoC, a CPU, a microcontroller (MCU), and a storage controller. Different processing units may be independent devices, or may be integrated into one or more processors. In addition, the logic circuit 210 and the logic circuit 310 may be a same processor, or may be different processors.

In this embodiment of the present invention, the processing device 200 may further include one or more storage units, for example, may include a volatile memory such as a dynamic random access memory (DRAM) or a static random access memory (SRAM); or may include a non-volatile memory (NVM) such as a read-only memory (ROM) or a flash memory. Different storage units may be independent components, or may be integrated or packaged into one or more processors or communication interfaces, and become a part of the processor or the communication interface. The storage medium 320 of the storage device 300 may be one or more storage units. It should be noted that the storage medium 320 includes at least an NVM, such as a universal flash storage (UFS) or a solid state disk (SSD). In this way, the storage device 300 can better store the file written by the processing device 200.

It may be understood that a structure shown in this embodiment does not constitute a specific limitation to the terminal. In some other embodiments of this application, the terminal may include more or fewer components than those shown in the figure, combine some components, split some components, or have different component arrangements. The components shown in the figure may be implemented by using hardware, software, or a combination of software and hardware.

Figure 4:
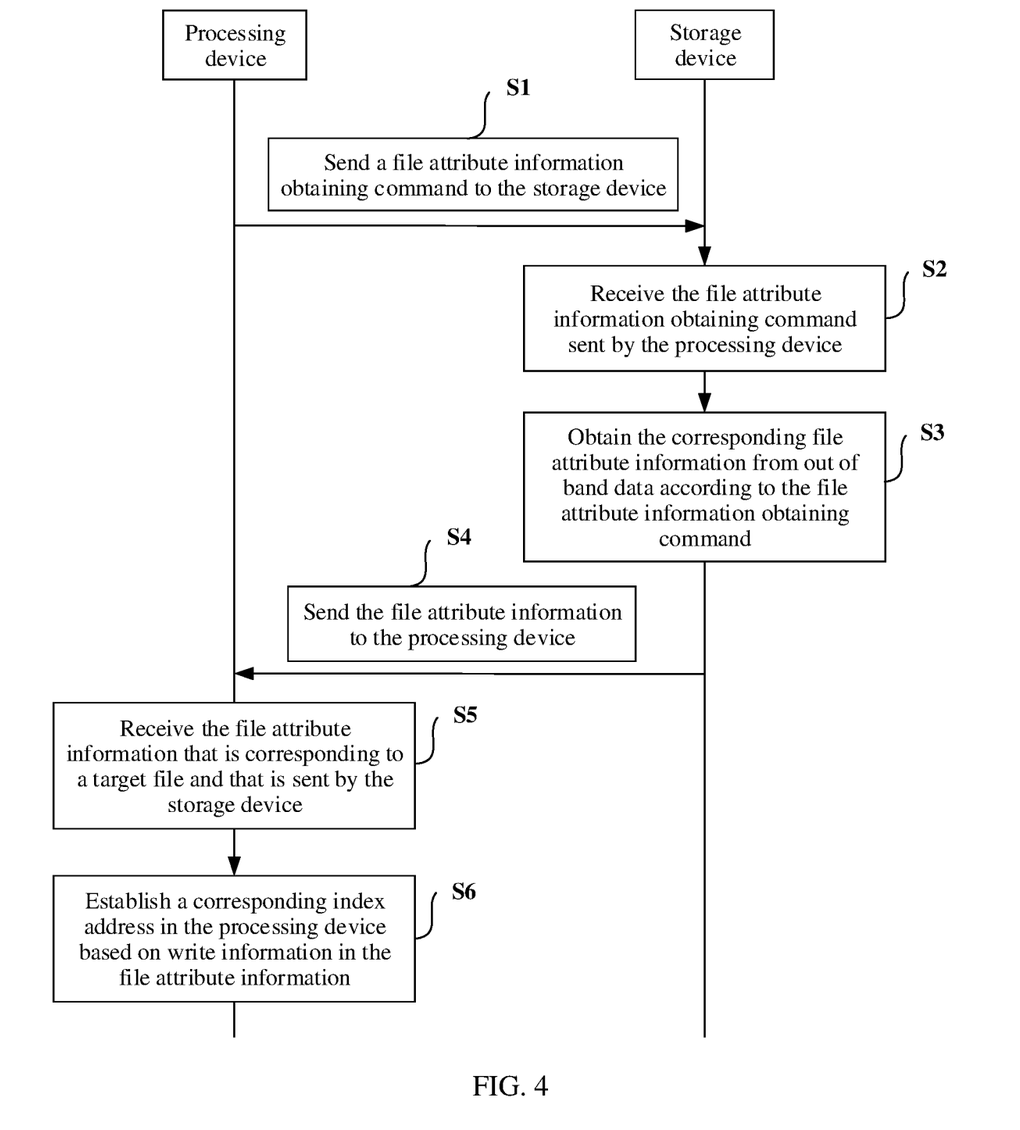
FIG. 4 is a flowchart of a data access method according to an embodiment of the present invention.

Based on the foregoing terminal, FIG. 4 is a flowchart of a data access method according to an embodiment of the present invention. As shown in FIG. 4, the method includes the following steps.

S1: The processing device sends a file attribute information obtaining command to the storage device.

Figure 5:
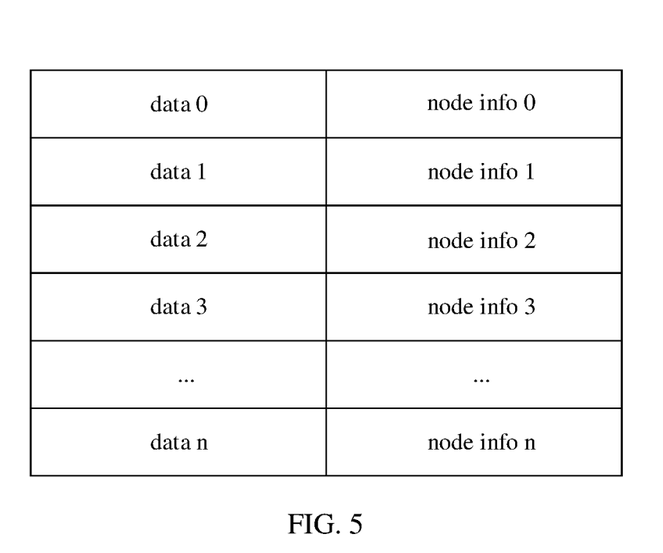
FIG. 5 is a schematic diagram of file attribute information according to an embodiment.

Before the terminal is powered off, the processing device 200 sends a target file to the storage device 300. In this embodiment, the target file is an updated file. The processing device 200 further needs to send file attribute information corresponding to the target file to the storage device 300. FIG. 5 is a schematic diagram of file attribute information provided in this embodiment. As shown in FIG. 5, a target file File A* is used as an example. File A* includes the following file data: data 0, data 1, data 2, data 3, . . . , and data n. Each piece of file data corresponds to one piece of write information: node info. The write information is used to record a writing location of corresponding file data in the storage device 300. Correspondingly, the file attribute information includes write information corresponding to all the file data in File A*. It should be noted that the processing device 200 may send the file attribute information to the storage device 300 before or at the same time of sending the target file to the storage device 300, to ensure that write information corresponding to written file data exists in the storage device 300 when the terminal is powered off.

The processing device 200 further needs to send a write command to the storage device 300, so that the storage device 300 performs an action of writing the target file. In a writing process, the storage device 300 needs to write the file attribute information to the out of band data 340, to ensure that the file attribute information is not lost after the terminal 100 is powered off and can still be used by the processing device 200.

In an implementation, the processing device 200 may send the target file, the file attribute information, and a data write command to the storage device 300 in a plurality of times when there is a relatively small quantity of data transmission threads between the processing device 200 and the storage device 300 or volumes of the target file and the file attribute information are relatively large. For example, the processing device 200 sends the target file and the file attribute information to the storage device 300 in a first time, and the processing device 200 sends the data write command to the storage device 300 in a second time.

In another possible implementation, when there is a relatively large quantity of data transmission threads between the processing device 200 and the storage device 300 or volumes of the target file and the file attribute information are relatively small, the processing device 200 may add both the target file and the file attribute information to a write command, so that utilization of one data transmission process between the processing device 200 and the storage device 300 is improved.

Figure 6:
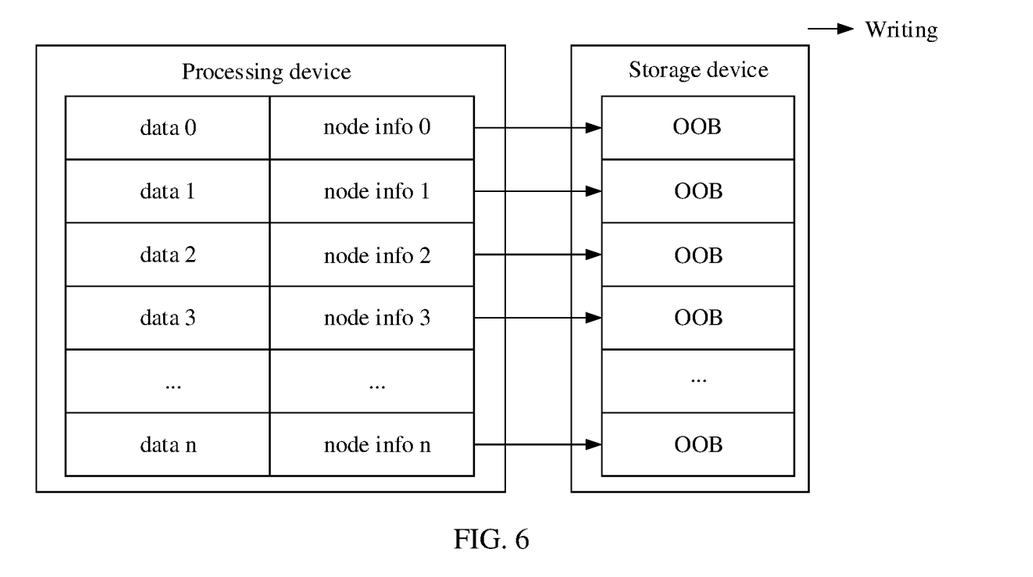
FIG. 6 is a schematic diagram of a process of writing file attribute information to out of band data according to an embodiment of the present invention.

FIG. 6 is a schematic diagram of a process of writing file attribute information to out of band data according to an embodiment of the present invention. As shown in FIG. 6, write information corresponding to each piece of file data is written to one piece of out of band data, and the out of band data is not different. File data may be written to different out of band data, or a plurality of pieces of file data may be written to a same piece of out of band data.

Figure 7:
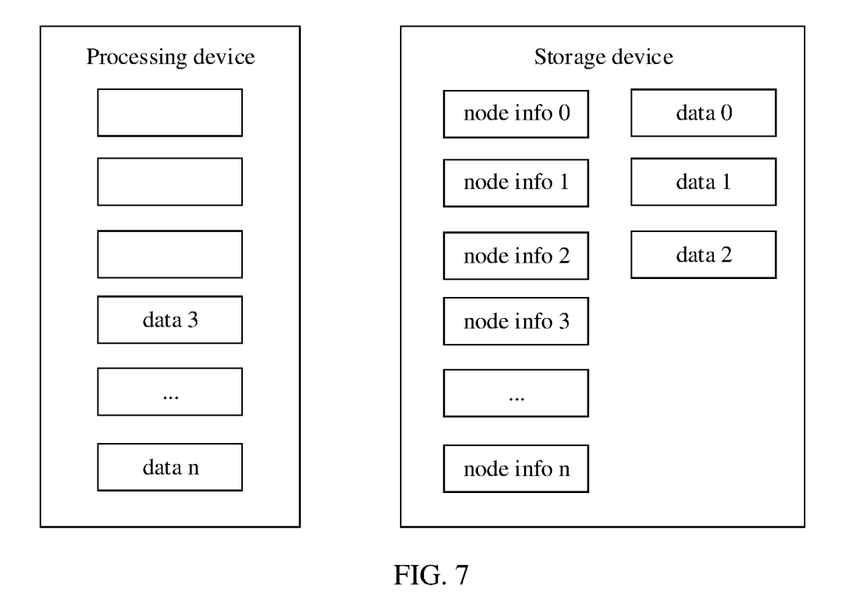
FIG. 7 is a schematic diagram of statuses of file data in a processing device and file data in a storage device when a terminal is powered off according to an embodiment of the present invention.

After the processing device 200 writes the file data to the storage device 300, the terminal is powered off. In this case, index addresses of some file data that has been written to the storage device 300 have not been established in the processing device 200. In an implementation, after all the file data of the target file is written to the storage device 300, the processing device 200 establishes corresponding index addresses. Therefore, after the terminal is powered off, a corresponding index address of neither of all file data that has been written to the storage device 300 has been established in the processing device 200. FIG. 7 is a schematic diagram of statuses of file data in the processing device and file data in the storage device when the terminal is powered off according to an embodiment of the present invention. As shown in FIG. 7, the processing device 200 includes the following file data: data 3, . . . , and data n that have not been written to the storage device 300, and data 0, data 1, and data 2 have been written to the storage device 300. Index addresses corresponding to the data 0, the data 1, and the data 2 have not been established in the processing device 200. In this case, the processing device 200 cannot access the data 0, the data 1, and the data 2.

Figure 8:
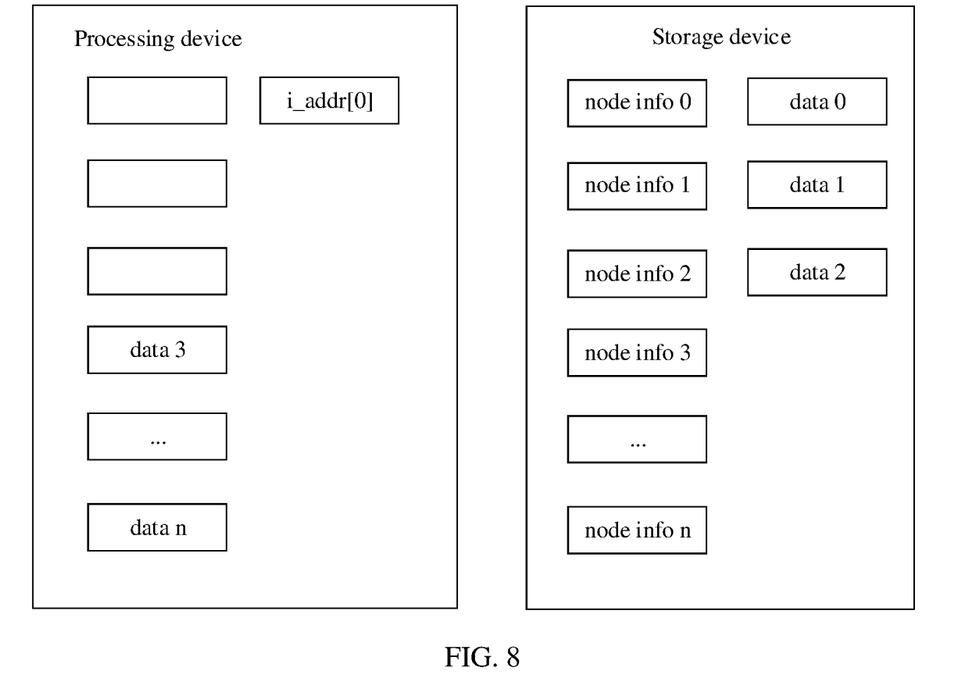
FIG. 8 is another schematic diagram of statuses of file data in a processing device and file data in a storage device when a terminal is powered off according to an embodiment of the present invention.

In another implementation, the processing device 200 establishes, based on a preset period, an index address corresponding to file data that has been written to the storage device 300. After the terminal 100 is powered off, corresponding index addresses of some file data that has been written to the storage device 300 have not been established in the processing device 200. FIG. 8 is another schematic diagram of statuses of file data in the processing device and file data in the storage device when the terminal is powered off according to an embodiment of the present invention. As shown in FIG. 8, the processing device 200 includes the following file data: data 3, . . . , and data n that have not been written to the storage device 300, and data 0, data 1, and data 2 have been written to the storage device 300. A corresponding index address i_addr[0] of the data 0 has been established in the processing device 200. In this case, the processing device 200 may access the data 0 by using i_addr[0].

To enable the processing device 200 to access written file data, the processing device 200 needs to establish, after the terminal 100 is powered on again, an index address corresponding to the written file data. Because write information that can be used to establish the index address has been written to the out of band data of the storage device 300, the processing device 200 needs to send a file attribute information obtaining command to the storage device 300, to obtain write information corresponding to each piece of file data in the target file File A*.

In an implementation, when the terminal 100 is powered off, the processing device 200 writes at least one target file to the storage device 300. In this way, after the terminal 100 is powered on again, the processing device 200 needs to establish index addresses for file data corresponding to all target files. When index addresses are simultaneously established for a plurality of target files, if there is a relatively small quantity of data transmission threads between the processing device 200 and the storage device 300, or a volume of file attribute information corresponding to each target file is relatively large, an instruction for obtaining file attribute information of only one target file or obtaining file attribute information of a relatively small quantity of target files may be carried in each file attribute information obtaining command, to balance a data transmission process between the processing device 200 and the storage device 300, and improve data transmission efficiency; and if there is a relatively large quantity of data transmission threads between the processing device 200 and the storage device 300, or a volume of file attribute information corresponding to each target file is relatively small, an instruction for obtaining file attribute information of a relatively large quantity of target files or file attribute information of all the target files may be carried in each file attribute information obtaining command, to improve utilization of one data transmission process.

It may be learned from the foregoing descriptions that, when index addresses of a plurality of target files are established, the processing device 200 may send, by sending the file attribute information obtaining command once, an instruction for obtaining file attribute information of all the target files; or may send the file attribute information obtaining command for a plurality of times, and the file attribute information obtaining command sent each time carries an instruction for obtaining file attribute information of some target files. Further, when a volume of the file attribute information is relatively large, to reduce data transmission time, file attribute information corresponding to one target file may be split into a plurality of pieces of sub-file attribute information. In this way, the processing device 200 may correspondingly obtain one piece of sub-file attribute information from each file attribute information obtaining command, and obtain all file attribute information of one target file by sending the file attribute information for a plurality of times.

In another implementation, the file attribute information obtaining command is a read command. If the read command is used, the processing device 200 can be effectively prevented from modifying data in the storage device 300 when reading the file attribute information in the storage device 300, to ensure data security of the processing device 200 and the storage device 300.

S2: The storage device receives the file attribute information obtaining command sent by the processing device.

The storage device 300 receives the file attribute information obtaining command sent by the processing device 200, and feeds back corresponding file attribute information according to the file attribute information obtaining command.

S3: The storage device obtains the corresponding file attribute information from the out of band data according to the file attribute information obtaining command.

For example, if the out of band data in the storage device 300 stores file attribute information corresponding to a plurality of target files, the storage device 300 needs to obtain the corresponding file attribute information from the out of band data based on an identifier such as a name that is of the target file and that is carried in the file attribute information obtaining command. When file attribute information of a same target file is obtained by using a plurality of file attribute information obtaining commands, the storage device 300 obtains a corresponding part of information in the file attribute information based on a quantity of rows in each file attribute information obtaining command, a variable name, and the like.

S4: The storage device sends the file attribute information to the processing device.

In an implementation, the storage device 300 sends the file attribute information to the processing device 200 according to the file attribute information obtaining command sent by the processing device 200.

In another implementation, after receiving the file attribute information obtaining command sent by the processing device 200, the storage device 300 sends the file attribute information to the processing device 200 in a manner corresponding to an actual requirement. For example, the storage device 300 may send file attribute information of one or more target files to the processing device 200 at a time. If there is relatively small quantity of data transmission threads between the storage device 300 and the processing device 200, or a volume of file attribute information of each target file is relatively large, the storage device 300 may send file attribute information of one target file or a small quantity of target files to the processing device 200 at a time, to balance a data transmission process between the processing device 200 and the storage device 300, and improve data transmission efficiency. If there is a relatively large quantity of data transmission threads between the storage device 300 and the processing device 200, or a volume of file attribute information of each target file is relatively small, the storage device 300 may send file attribute information of a relatively large quantity of target files or all the target files to the processing device 200 at a time, to improve utilization of one data transmission process.

In another implementation, when a volume of file attribute information corresponding to one target file is relatively large, the storage device 300 may send, to the processing device 200 in a plurality of times, the file attribute information corresponding to the target file, to reduce time of each transmission, so that the processing device 200 may establish a corresponding index address based on received partial file attribute information while receiving partial file attribute information in next transmission. In this way, a total duration in which the processing device 200 establishes the index address is shortened.

S5: The processing device receives the file attribute information that is corresponding to the target file and that is sent by the storage device.

The file attribute information includes at least file node information of the target file and offset information of file data in the target file in the storage device 300.

The processing device 200 may determine, based on the file node information, the target file corresponding to the file data, and in addition, determine, based on the offset information, the file data and a change of a writing location of the file data in the storage device 300 before the target file is updated, to determine a writing location of the file data in the storage device 300 after the target file is updated.

In addition, the file attribute information may further include writing time of the target file. The processing device 200 may determine different versions of a same target file based on the writing time of the target file, and further establish corresponding index addresses for target files of different versions. The file attribute information may alternatively include other information used to determine the writing location of the target file.

S6: The processing device establishes a corresponding index address in the processing device based on write information in the file attribute information.

Figure 9:
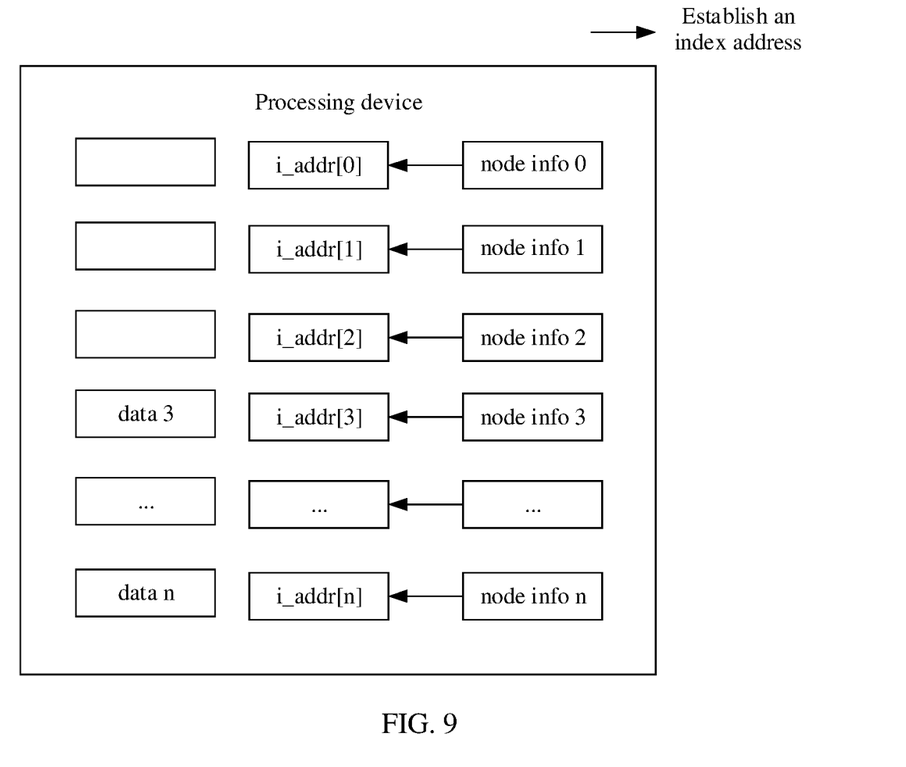
FIG. 9 is a schematic diagram of establishing an index address by a processing device based on file attribute information according to an embodiment of the present invention.

FIG. 9 is a schematic diagram of establishing an index address by a processing device based on file attribute information according to an embodiment of the present invention. As shown in FIG. 9, the processing device 200 obtains write information node_info 0, node_info 1, node_info 2, node_info 3, . . . , and node_info n corresponding to file data: data 0, data 1, data 2, data 3, . . . , and data n in the file attribute information of the target file File A*, and establishes, based on the write information, index addresses i_addr[0], i_addr[1], i_addr[2], i_addr[3], . . . , and i_addr[n] corresponding to the file data. In this way, all the file data in the File A* has corresponding index addresses in the processing device 200. Certainly, file data that has been written to the storage device 300 also has a corresponding index address in the processing device 200. Therefore, the processing device 200 can use the index address to access the file data that has been written to the storage device 300.

In addition, after the terminal 100 is powered on again, the processing device 200 may continue to write the file data: the data 3, . . . , and the data n in File A* to the storage device 300. In this case, the processing device 200 may directly access the file data: the data 3, . . . , and the data n by using established index addresses, and does not need to establish index addresses after the data 3, . . . , and the data n are written. In this way, a duration in which the processing device 200 writes the target file to the storage device 300 and the target file can be accessed can be effectively shortened.

When the terminal 100 shown in FIG. 8 is powered off, the processing device 200 has established an index address for some file data, that is, data 0, that has been written to the storage device 300. In this case, when the processing device 200 establishes the index address based on the file attribute information of File A*, because the data 0 corresponds to two index addresses if an index address is established again based on the write information node_info 0 corresponding to the data 0, an access failure may occur. In this case, the two index addresses need to be distinguished. For example, a previously established index address may be replaced with a subsequently established index address; or an index limit is set for the processing device 200, to be specific, a same piece of file data is accessed by using a latest established index address; or the index addresses are distinguished in another manner.

Figure 10:
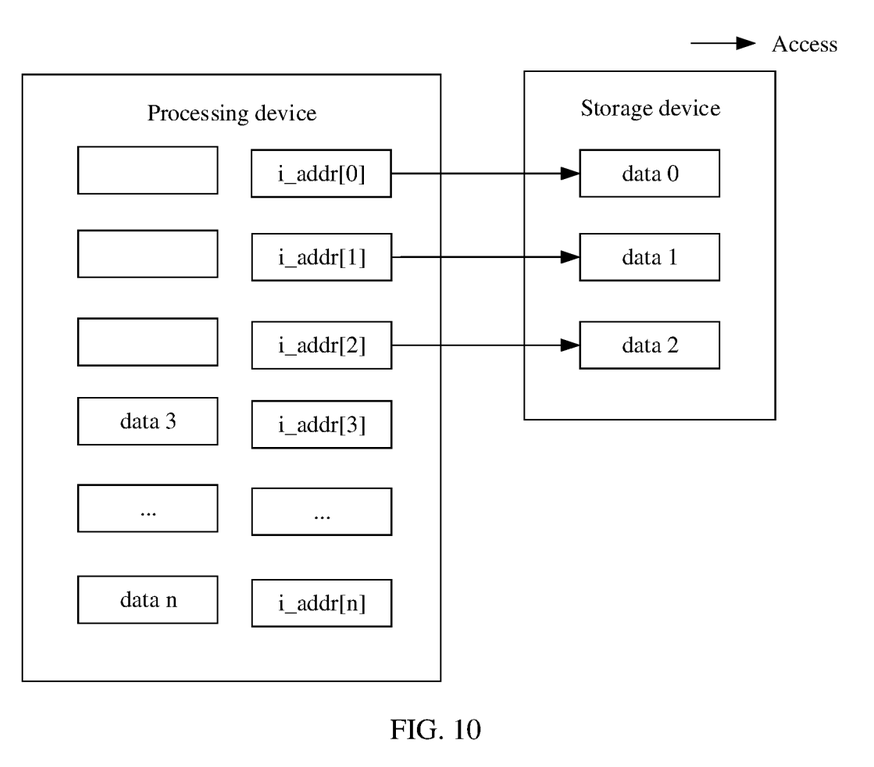
FIG. 10 is a schematic diagram of accessing, by a processing device, file data that has been written to a storage device according to an embodiment of the present invention.

FIG. 10 is a schematic diagram of accessing, by the processing device, the file data that has been written to the storage device according to an embodiment of the present invention. As shown in FIG. 10, the processing device 200 may correspondingly access the data 0, the data 1, and the data 2 by using i_addr[0], i_addr[1], and i_addr[2].

In this embodiment of the present invention, after the terminal 100 is powered on again, the processing device 200 may establish the corresponding index address by using the file attribute information stored in the out of band data 340 of the storage device 300, to use the index address to access the file data that has been written to the storage device 300, so that the file data that has been written to the storage device 300 is restored without repeatedly writing the file data.

Embodiment 2

Based on Embodiment 1, Embodiment 2 provides a data access method and apparatus. A difference between Embodiment 2 and Embodiment 1 lies in: That the processing device 200 sends the file attribute information obtaining command to the storage device 300 further includes the following process:

S101: Obtain unwritten file data stored in the processing device.

S102: Determine target file data based on all the file data in the target file and the unwritten file data.

S103: Generate the file attribute information obtaining command.

If a volume of the file attribute information corresponding to the target file is relatively large, the processing device 200 obtains all file attribute information corresponding to the target file from the storage device 300, and consequently, a large amount of data is transmitted simultaneously, and not only transmission time is relatively long, but also transmission congestion is easily caused. In addition, if the processing device 200 does not need to continue to write the unwritten file data to the storage device 300, a large amount of invalid information exists in the obtained file attribute information, and the invalid information also occupies a memory of the processing device 200.

To obtain the file attribute information more specifically, in this embodiment, before the file attribute information obtaining command is sent, it is first determined that target file data for which a write command needs to be obtained, and a corresponding file attribute information obtaining command is generated for the write command.

Specifically, for the target file File A*, all the file data includes data 0, data 1, data 2, data 3, . . . , and data n. As shown in FIG. 7 and FIG. 8, the unwritten file data includes the data 3, . . . , and the data n, and the target file data is the data 0, the data 1, and the data 2. The processing device 200 may generate only file attribute information obtaining commands for obtaining write information of the data 0, the data 1, and the data 2. Correspondingly, file attribute information fed back by the storage device 300 includes the write information corresponding to the data 0, the data 1, and the data 2.

Further, for a status shown in FIG. 8, to avoid a case in which a same piece of file data corresponds to a plurality of index addresses, file data for which a corresponding index address has been established in the processing device 200 may be removed from the target file data, for example, the data 0. In this case, the target file data is the data 1 and the data 2. The processing device 200 only needs to generate file attribute information obtaining commands for the data 1 and the data 2.

Figure 11:
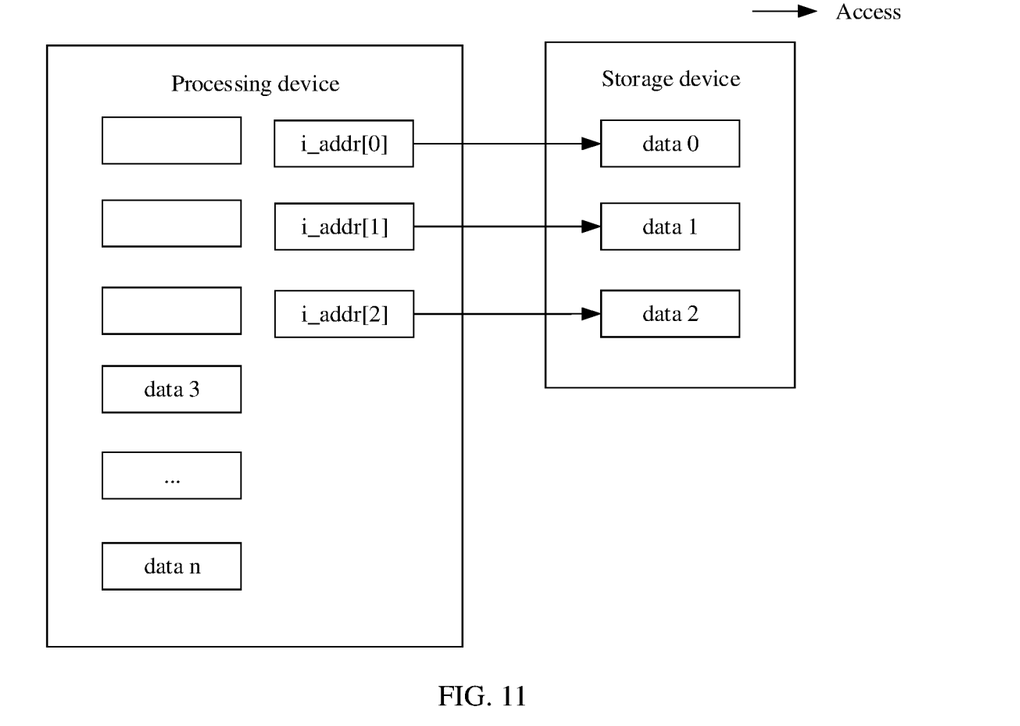
FIG. 11 is a schematic diagram of accessing, by a processing device, target data based on an index address according to an embodiment of the present invention.

FIG. 11 is a schematic diagram of accessing, by the processing device, the target data based on the index address according to an embodiment of the present invention. As shown in FIG. 11, the processing device 200 establishes only index addresses i_addr[0], i_addr[1], and i_addr[2] corresponding to the target file data, and accesses the target file data, that is, the data 0, the data 1, and the data 2, by using the index addresses.

Embodiment 3

Based on Embodiment 1, Embodiment 3 provides a data access method and apparatus. A difference between Embodiment 3 and Embodiment 1 lies in: That the processing device 200 establishes the index address based on the file attribute information further includes the following process:

S201: Obtain unwritten file data stored in the processing device.

S202: Determine target file data based on all the file data in the target file and the unwritten file data.

S203: Determine, from the file attribute information, writing location information and location offset information corresponding to the target file data.

S204: Establish a corresponding index address in the processing device based on the writing location information and the location offset information corresponding to the target file data.

If the storage device 300 sends the file attribute information corresponding to the target file to the processing device 200, and the attribute information includes write information corresponding to all the file data in the target file. In this case, if the processing device 200 establishes an index address based on the file attribute information, the processing device 200 needs to establish an index address of file data that has been written to the storage device 300 and an index address of file data that has not been written to the storage device 300. In this way, the index address that is established by the processing device 200 and that corresponds to the file data that has not been written to the storage device 300 does not work for the processing device 200 to access the file data that has been written to the storage device 300. In addition, the processing device 200 may not use the index address in a short time, or the processing device 200 may not continue to write the file data that has not been written to the storage device 300. Therefore, the processing device 200 wastes time and a resource in establishing the index address corresponding to this part of file data.

To make an operation of establishing the index address by the processing device 200 more specific, before the index address is established, target file data for which an index address needs to be established may be first determined. For example, as shown in FIG. 7 and FIG. 8, for the target file File A*, all the file data includes data 0, data 1, data 2, data 3, ..., and data n. The unwritten file data includes the data 3, ..., and the data n, and the target file data is the data 0, the data 1, and the data 2. In this way, the processing device 200 may select write information corresponding to the data 0, data 1, and data 2 from the file attribute information, and then establish index addresses corresponding to the data 0, data 1, and data 2 based on the write information.

Further, for a status shown in FIG. 8, to avoid a case in which a same piece of file data corresponds to a plurality of index addresses, file data for which a corresponding index address has been established in the processing device 200 may be removed from the target file data, for example, the data 0. In this case, the target file data is the data 1 and the data 2. The processing device 200 only needs to select the write information corresponding to the data 1 and the data 2 from the file attribute information.

For a process in which the processing device 200 accesses the target data based on the established index address, refer to FIG. 11. Details are not described herein again.

The objectives, technical solutions, and benefits of the present invention are further described in detail in the foregoing specific embodiments. It should be understood that the foregoing descriptions are merely non-limiting example embodiments of the present invention, and are not intended to limit the protection scope, which is intended to cover any modification, equivalent replacement, or improvement made based on the technical solutions of the present invention.

What is claimed is:

1. A data access method performed by a processing device, wherein the processing device manages a storage device based on a log-structured file system (LFS), and the method comprises:
   writing, by the processing device, a target file to the storage device based on an out place update (OPU) mechanism; and
   writing, by the processing device, file attribute information corresponding to the target file in the storage device to out of band (OOB) data of the storage device, to restore, after abnormal power-off, access to the target file by using the file attribute information stored in the OB data;
   after being powered on again, obtaining, by the processing device, the file attribute information corresponding to the target file from the OB data of the storage device, wherein the file attribute information comprises writing location information and location offset information of each piece of file data in the target file; and
   establishing, by the processing device, in the processing device by using the writing location information and the location offset information in the file attribute information, an index address corresponding to each piece of file data, so that the processing device accesses, by using the index address, file data that has been written to the storage device.

2. The data access method of claim 1, further comprising:
   sending, by the processing device, a command to the storage device once or a plurality of times, the command requesting for obtaining file attribute information.

3. The data access method of claim 2, wherein the command requests for obtaining file attribute information corresponding to one or more target files.

4. The data access method of claim 2, wherein the command is a read command.

5. The data access method of claim 1, wherein the obtaining the file attribute information corresponding to the target file from the GOB data of the storage device comprises:
   obtaining, from the GOB data of the storage device, file attribute information corresponding to target file data, wherein the target file data is file data that is in the target file and that has been written to the storage device.

6. The data access method of claim 5, wherein the establishing, by the processing device, in the processing device by using the writing location information and the location offset information in the file attribute information, an index address corresponding to each piece of file data comprises:
   obtaining, by the processing device, unwritten file data stored in the processing device, wherein the unwritten file data is file data that is in the target file and that has not been written to the storage device when the processing device is abnormally powered off;
   determining, by the processing device, the target file data based on all file data in the target file and the unwritten file data, wherein the target file data is file data that is in the target file and that has been written to the storage device when the processing device is abnormally powered off;
   determining, by the processing device from the file attribute information, writing location information and location offset information corresponding to the target file data; and
   establishing, by the processing device, a corresponding index address in the processing device based on the writing location information and the location offset information corresponding to the target file data.

7. A data access method performed by a storage device, wherein the storage device manages an internally stored target file by using a processing device based on a log-structured file system (LFS), and the method comprises:
   when the processing device writes the target file based on an out place update (OPU) mechanism, writing, by the storage device, the target file to a local storage medium, and writing file attribute information of the target file to out of band (OOB) data, to provide the file attribute information for the processing device after the processing device is abnormally powered off, and enable the processing device to restore access to the target file by using the file attribute information;
   after being powered on again, obtaining, by the processing device, the file attribute information corresponding to the target file from the OB data of the storage device, wherein the file attribute information comprises writing location information and location offset information of each piece of file data in the target file; and
   establishing, by the processing device, in the processing device by using the writing location information and the location offset information in the file attribute information, an index address corresponding to each piece of file data, so that the processing device accesses, by using the index address, file data that has been written to the storage device.

8. The method of claim 7, wherein sending, by the storage device, the file attribute information to the processing device once or a plurality of times.

9. The method of claim 7, wherein sending, by the storage device, the file attribute information corresponding to one or more target files to the processing device each time.

10. A terminal, comprising a processing device and a storage device, wherein the processing device manages the storage device based on a log-structured file system (LFS), and when the processing device writes a target file to the storage device based on an out place update (OPU) mechanism, and the processing device is configured to perform operation comprising:

writing a target file to the storage device based on an out place update (OPU) mechanism; and writing file attribute information corresponding to the target file in the storage device to out of band (OOB) data of the storage device, to restore, after abnormal power-off, access to the target file by using the file attribute information stored in the GOB data;

after being powered on again, obtaining the file attribute information corresponding to the target file from the OB data of the storage device, wherein the file attribute information comprises writing location information and location offset information of each piece of file data in the target file; and establishing in the processing device by using the writing location information and the location offset information in the file attribute information, an index address corresponding to each piece of file data, so that the processing device accesses, by using the index address, file data that has been written to the storage device.

11. The terminal of claim 10, wherein the processing device is further configured to perform operations comprising:

sending a command to the storage device once or a plurality of times, the command requesting for obtaining file attribute information.

12. The terminal of claim 11, wherein the command requests for obtaining file attribute information corresponding to one or more target files.

13. The terminal of claim 11, wherein the command is a read command.

14. The terminal of claim 10, wherein the obtaining the file attribute information corresponding to the target file from the GOB data of the storage device comprises:

obtaining, from the GOB data of the storage device, file attribute information corresponding to target file data, wherein the target file data is file data that is in the target file and that has been written to the storage device.

15. The terminal of claim 14, wherein the establishing in the processing device by using the writing location information and the location offset information in the file attribute information, an index address corresponding to each piece of file data comprises:

obtaining unwritten file data stored in the processing device, wherein the unwritten file data is file data that is in the target file and that has not been written to the storage device when the processing device is abnormally powered off;

determining the target file data based on all file data in the target file and the unwritten file data, wherein the target file data is file data that is in the target file and that has been written to the storage device when the processing device is abnormally powered off;

determining, from the file attribute information, writing location information and location offset information corresponding to the target file data; and establishing a corresponding index address in the processing device based on the writing location information and the location offset information corresponding to the target file data.

16. The terminal of claim 10, wherein the storage device is configured to perform operations comprising:

When the processing device writes the target file based on an out place update (OPU) mechanism, writing the target file to a local storage medium, and writing file attribute information of the target file to out of band (OOB) data, to provide the file attribute information for the processing device after the processing device is abnormally powered off, and enable the processing device to restore access to the target file by using the file attribute information.

17. The terminal of claim 16, wherein the storage device is further configured to perform operations comprising:

sending the file attribute information to the processing device once or a plurality of times.

18. The terminal of claim 16, wherein the storage device is further configured to perform operations comprising:

sending the file attribute information corresponding to one or more target files to the processing device each time.

* * * * *